(12) United States Patent
Takashima et al.

(10) Patent No.: US 6,631,894 B2
(45) Date of Patent: Oct. 14, 2003

(54) CONTROLLED-TYPE LIQUID-FILLED VIBRATION ISOLATOR

(75) Inventors: Yukio Takashima, Osaka (JP); Tsutomu Hashimoto, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 83 days.

(21) Appl. No.: 09/937,553

(22) PCT Filed: Apr. 2, 2001

(86) PCT No.: PCT/JP01/02872
§ 371 (c)(1),
(2), (4) Date: Sep. 26, 2001

(87) PCT Pub. No.: WO01/81786
PCT Pub. Date: Nov. 1, 2001

(65) Prior Publication Data
US 2003/0047855 A1 Mar. 13, 2003

(30) Foreign Application Priority Data
Apr. 11, 2000 (JP) ........................... 2000-109317

(51) Int. Cl.[7] .................................................. F16F 5/00
(52) U.S. Cl. ............................................... 267/140.14
(58) Field of Search ............... 267/140.11, 140.13, 267/141.4, 141.5, 141.6, 141.7, 140.14, 140.15, 219, 220

(56) References Cited

U.S. PATENT DOCUMENTS

| | | | |
|---|---|---|---|
| 5,167,403 A | * | 12/1992 | Muramatsu et al. ... 267/140.13 |
| 5,205,546 A | | 4/1993 | Schisler et al. |
| 5,443,574 A | * | 8/1995 | Ohtake et al. ......... 267/140.14 |
| 5,620,168 A | * | 4/1997 | Ohtake et al. ......... 267/140.13 |
| 5,988,611 A | * | 11/1999 | Takashima et al. .... 267/140.13 |
| 5,992,833 A | * | 11/1999 | Tanahashi .............. 267/140.14 |
| 6,082,718 A | * | 7/2000 | Yamada et al. ........ 267/140.14 |
| 6,158,724 A | * | 12/2000 | Takashima et al. .... 267/140.13 |
| 6,176,477 B1 | * | 1/2001 | Takeo et al. ........... 267/140.11 |
| 6,412,760 B2 | * | 7/2002 | Shimoda et al. ....... 267/140.13 |
| 6,425,575 B1 | * | 7/2002 | Takashima et al. .... 267/140.13 |

FOREIGN PATENT DOCUMENTS

| | | |
|---|---|---|
| JP | 4121939 | 1/1993 |
| JP | 5-118375 | 5/1993 |
| JP | 6-264956 | 9/1994 |
| JP | 11-173372 | 6/1999 |
| JP | 2001-82534 | 3/2001 |
| JP | 2001-140971 | 5/2001 |

* cited by examiner

Primary Examiner—Jack Lavinder
Assistant Examiner—Xuan Lan Nguyen
(74) Attorney, Agent, or Firm—Jordan and Hamburg LLP

(57) ABSTRACT

In a vibration isolator, stable liquid filling and assembling is obtained by reducing the effect of press-fitting a switching admission pipe. The vibration isolator including a partition having a partition main member and a partition plate member, a main liquid chamber, a first sub liquid chamber, a second sub liquid chamber and a switch chamber, orifices, and a switching admission pipe press-fit in a passage provided in the partition main member. A seal surface in contact with a seal rubber layer on an inner periphery of a cylindrical barrel is formed at around an opening end of a passage in an outer peripheral surface of the partition main member and a pressure-receiving surface broader than the other portion in the outer peripheral surface is provided on a side opposite to the seal surface sandwiching a device axis thereby effecting dispersal of external force during the press-fitting.

5 Claims, 5 Drawing Sheets

CONTROLLED-TYPE LIQUID-FILLED VIBRATION ISOLATOR

TECHNICAL FIELD

The present invention relates to a controlled-type liquid-filled vibration isolator used for supporting a power unit, such as an automotive engine in an anti-vibratory fashion.

BACKGROUND OF THE INVENTION

Conventionally, as a liquid-filled vibration isolator used in a mount for support not to transmit the vibration of a vibrating body, such as an automotive engine, there has been a proposal of a controlled-type liquid-filled vibration isolator adapted to switch the anti-vibration characteristic depending upon two kinds of vibrations having a different frequency region, such as shake vibration and idle vibration.

For example, Japanese Patent Laid-open No. 173372/1999 proposes a controlled-type liquid-filled vibration isolator having an anti-vibration basic member formed by a metal fitting on a vibration-source side, an outer cylindrical metal fitting on a support side and a rubber elastic member interposed between them, a first diaphragm attached on the outer cylindrical metal fitting oppositely to the anti-vibration basic member and a partition arranged between the diaphragm and the anti-vibration basic member, wherein a main liquid chamber is formed between the partition and the anti-vibration basic member and a first sub liquid chamber is formed to have communication with the main liquid chamber through a first orifice between the partition and the first diaphragm, and further a second sub liquid chamber is provided on a main-chamber side of the partition to have communication with the main liquid chamber through a second orifice and a switch chamber isolated from the second chamber by a second diaphragm to enable switching and admitting atmospheric pressure and negative pressure.

Meanwhile, in the case of the proposed device, the structural members for the partition must be press-fitted and assembled in order while positioning an orifice opening in a liquid. There are problems with complicated assembling, insufficient stability and so on. For this reason, the present applicant has proposed a liquid-filled vibration isolator having a structure the partition is to be temporarily assembled in air to press-fit and assemble in a liquid the temporarily-assembled partition in an inner periphery of a cylindrical metal fitting vulcanization-adhered to the anti-vibration basic member (Japanese Patent Application No. 256996/1999).

In any of the above controlled-type liquid-filled vibration isolators, the main member of the partition has a switch-admission passage communicating from the switch chamber to the outer periphery in order to switch the admission of atmospheric pressure and negative pressure in the switch chamber provided on the main-liquid-chamber side, providing connection switch means, such as a switching valve, of between atmospheric pressure and negative pressure through an admission pipe. The admission pipe is press-fitted in the passage penetrating the cylindrical metal fitting and opened in the outer periphery of the partition main member.

Usually, in air the admission pipe is press-fitted into the passage after the structural parts, such as the partition, including the first and second orifices are press-fitted and assembled in an inner periphery of the cylindrical metal fitting in a liquid.

Consequently, the press-fit pressure of the admission pipe during the assembling acts upon the main member of the partition in a direction of press-fit, or in a constant radial direction. The main member of the partition is relatively displaced by the affection of compression or the like of the seal rubber layer. As a result, the sealability in the outer periphery lowers resulting in a problem that stable liquid filling and assembling is difficult to keep.

In particular, with decrease in the outer peripheral thickness of the main member to which the admission pipe is to be press-fitted, the pressure increases that is received at the opposite portion to the side of press-fitting the admission pipe in the outer peripheral surface thus readily causing deviation due to relative displacement during press-fitting. Consequently, even where the main member of the partition is formed by an integrally-formed part of a metal material, such as aluminum, or a synthetic resin, there is a limitation in decreasing the outer peripheral thickness of the main member. Thus, there is a problem of impossible contribution to weight reduction.

The present invention has been made in view of the foregoing, and structured, in the above controlled-type liquid-filled vibration isolator, to reduce the affection due to pressure-fitting of the admission pipe for switching and admitting atmospheric pressure and negative pressure to a switch chamber thereby obtaining stable liquid filling and assembling and further providing contribution to weight reduction.

DISCLOSURE OF THE INVENTION

The present invention is a controlled-type liquid-filled vibration isolator comprising: an anti-vibration basic member formed by a rubber elastic member; a first metal fitting coupled to one of upper and lower sides of the anti-vibration basic member; a second metal fitting having a cylindrical barrel coupled to the other side of the anti-vibration basic member; a first diaphragm attached in the cylindrical barrel oppositely to the anti-vibration basic member; a partition arranged between the anti-vibration basic member and the first diaphragm; a main liquid chamber formed between the partition and the anti-vibration basic member; a first sub liquid chamber formed between the partition and the first diaphragm; a switch chamber capable of admitting, by switching, atmospheric pressure and negative pressure formed inward at a main liquid chamber side of the partition by a second diaphragm; a second sub liquid chamber isolated from the switch chamber by the second diaphragm; and first and second orifices respectively communicating the main liquid chamber with the first and second sub liquid chambers, and has the following structure in order to achieve the foregoing problem.

The partition has a partition main member having a recess for orifice forming a first orifice at a side of the first sub liquid chamber in an outer periphery and a partition plate member arranged at a side of the main liquid chamber of the partition main member to form the second sub chamber and second orifice, these being fitted on the cylindrical barrel through a seal rubber layer, and further a passage communicating from the switch chamber to the outer periphery being provided in the partition main member and the passage is fitted with an admission pipe for switching between atmospheric pressure and negative pressure penetrating the cylindrical barrel. The partition main member has a seal surface in contact with the seal rubber layer in an inner periphery of the cylindrical barrel, in an outer periphery thereof at around an opening end of the passage in a manner surrounding same, and a pressure-receiving surface broader than the other portion of the outer periphery being provided on an opposite side to the seal surface sandwiching a device axis to enable dispersion of an external force upon press-fitting the admission pipe.

According to the liquid-filled vibration isolator of this structure, each structural part for a partition to be assembled in the interior is press-fitted and assembled in the cylindrical barrel of the second metal fitting, and thereafter the admission pipe for admitting atmospheric pressure and negative pressure to the switch chamber is press-fitted and assembled in the passage provided in the internal partition main member through a hole provided in the cylindrical barrel. On this occasion, because the opposite side to an opening end of the passage to receive the greatest force upon press-fitting the admission pipe is provided with a pressure-receiving surface broader than the other portion, the contact area of that portion with the seal rubber layer on an inner periphery of the cylindrical barrel increases. The external force upon press-fitting the admission pipe can be dispersed by receiving it by this pressure-receiving surface thereby preventing the partition main member from relatively displacing due to compression or the like of the seal rubber layer. This, together with the formation of the seal surface at around the opening end of the passage ready to loosen in a manner surrounding the same, can favorably keep sealability between the partition main member and the seal rubber layer on an inner periphery of the cylindrical barrel, thus securing stable liquid filling and assembling.

It is preferred in the liquid-filled vibration isolator that the recess for orifice provided at a side of the first sub liquid chamber in an outer periphery of the partition main member is formed avoiding the seal surface and pressure-receiving surface thereby forming the seal surface and pressure-receiving surface to possess a surface broader than the other portion. This makes it possible to form the first orifice with a sufficient length and secure a seal surface and pressure-receiving surface broader than the other portion without increasing the thickness of the partition main member so much.

Also, it is preferred that the second sub liquid chamber and the second orifice are respectively formed at an inward and an outer periphery by the partition plate member arranged on a main liquid chamber side of the partition main member, the partition main member having a portion on an outer periphery upper surface of the partition main member corresponding to the second orifice being cutout in an area except for a portion of the seal surface and pressure-receiving surface. This makes it possible to set the second orifice with a great sectional area while securing a broad seal surface and pressure-receiving surface. Also, it is possible to reduce a material used for the partition main member and contribute to weight reduction.

In the liquid-filled vibration isolator, the recess for orifice provided at a side of the first sub liquid chamber in the outer periphery of the partition main member can be bent back inward at a required point to extend in an arcuate form about a device center, to have a length of approximately 1.0 to 1.5 times a circumference.

A partition retaining plate can be fixed by press-fit means at a side of the first sub liquid chamber of the partition main member, an opening of the recess for orifice on a side of the first sub liquid chamber being covered by the partition retaining plate thereby forming the first orifice, and the opening being provided in a position matched to the recess bent back of the partition retaining plate. This makes it easy to fabricate the partition main member. Furthermore, by adjusting the position of the opening within a length range of the bent-back recess, the length of the first orifice can be easily adjusted.

BEST MODE FOR CARRYING OUT THE INVENTION

Figure 1:
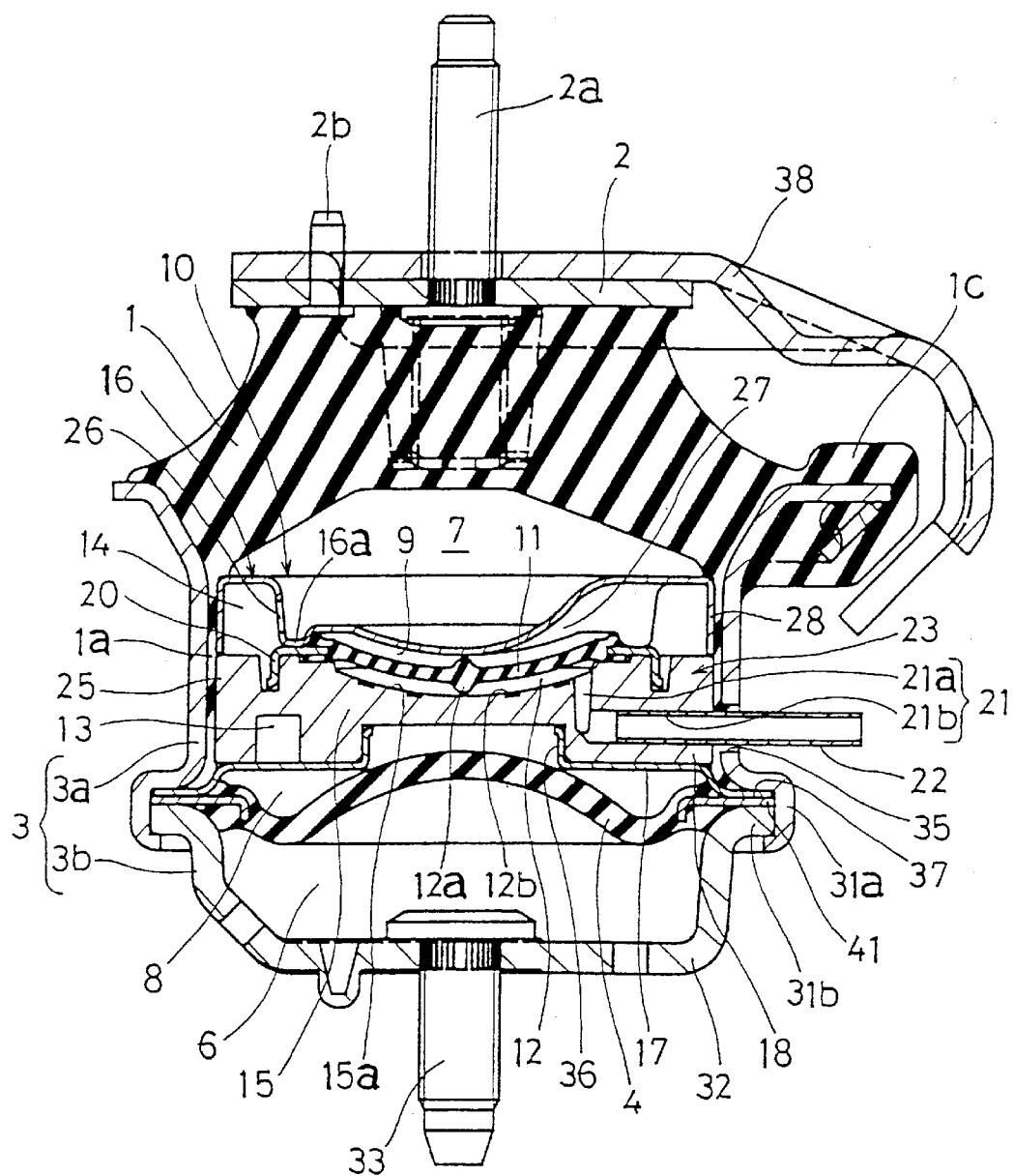
FIG. 1 is a sectional view showing an embodiment of a controlled-type liquid-filled vibration isolator of the invention.
Figure 2:
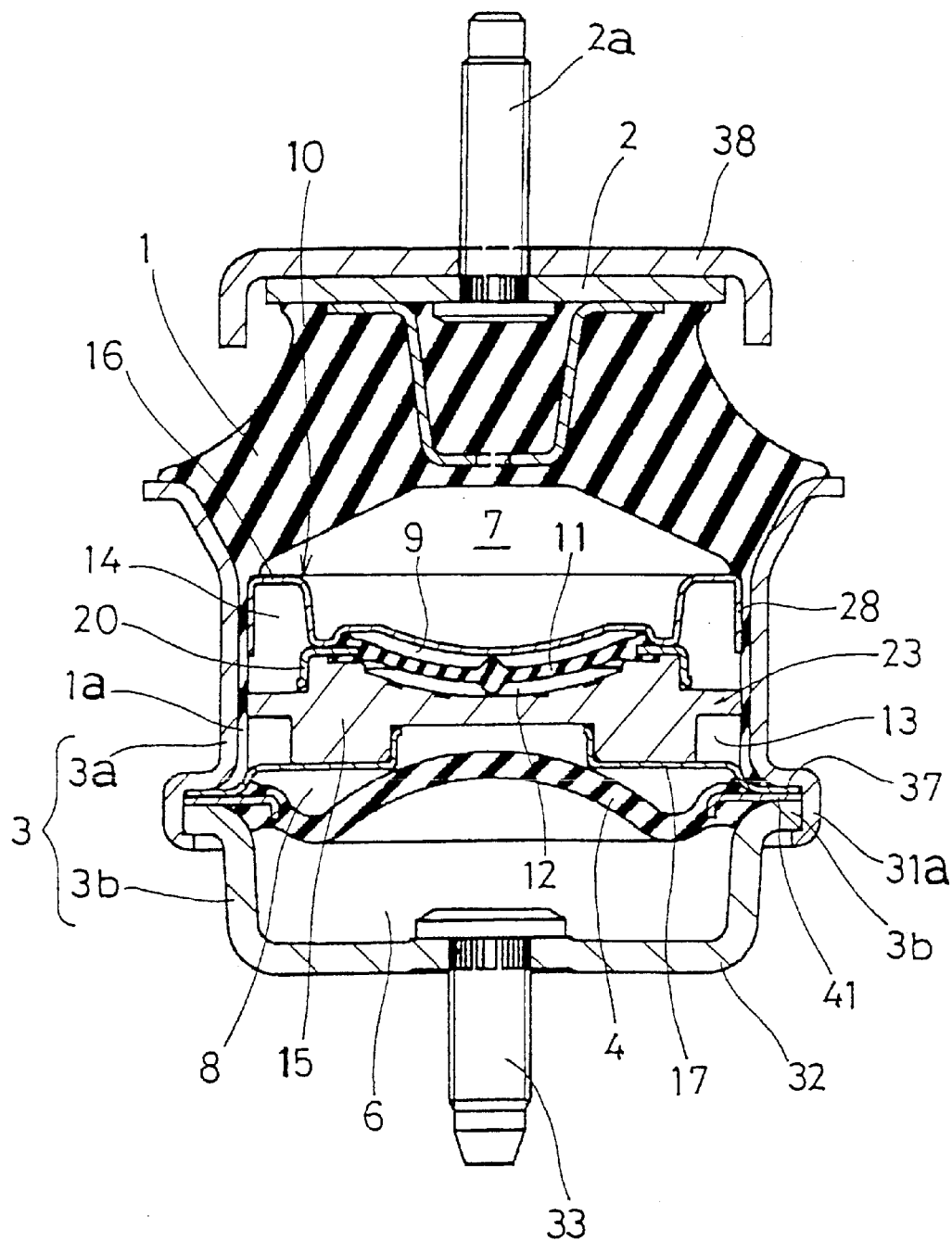
FIG. 2 is a vertical sectional view in a direction rectangular to the above figure of the same device.

Hereunder, the present invention will be explained on the basis of an embodiment illustrated in the drawings.

The present liquid-filled vibration isolator has, as shown in the figure, a first metal fitting (2) fixed, by vulcanization adhesive means, on an upper side of a anti-vibration basic member (1) formed by a rubber elastic member generally in a conical trapezoid form to receive a load of a power unit such as an engine and a second metal fitting (3) having a cylindrical barrel (3a) on a lower side of the anti-vibration basic member (1). That is, the first metal fitting (2) and the second fixture (3) are coupled together through the anti-vibration basic member (1). In the figure, the second metal fitting (3) includes the cylindrical barrel (3a) and a generally-cylindrical bottom member (3b) having a bottom that are coupled through crimped fastening means, hereinafter referred. The cylindrical barrel (3a) is fixed airtight on a lower periphery of the anti-vibration basic member (1) by the vulcanization adhesive means.

A first diaphragm (4), a rubber diaphragm, is arranged opposed to the anti-vibration basic member (2), at a lower-opening side of the cylindrical barrel (3a). This is fixed, together with a flanged opening edge (31b) of the bottom member (3b) covering the outer side thereof and a hereinafter-referred partitioning part (10), in a seal state by the crimped fastening means in the lower end (31a) of the cylindrical barrel (3a). (41) is an annular reinforcing member adhered by vulcanization to the diaphragm (4).

The first metal fitting (2) is generally in a disc form, in a center of which an upwardly-projecting mount bolt (2a) is fixed by press-fit or welding means. Through the mount bolt (2a), fixing is made to an automobile power unit or the like. (2b) is a positioning pin to be used in mounting.

Meanwhile, in a bottom wall (32) of the bottom member (3b) of the second metal fitting (3), a mount bolt (33) is downwardly provided by press-fit means or the like. Through the mount bolt (33), fixing with positioning is made to a vehicular-side member. Also, an air chamber (6) is formed between the bottom member (3b) and the first diaphragm (4). The air chamber (6), in cases, is communicated to the air or used as an air-sealed chamber.

The partitioning part (10) is fitted airtight to an inner periphery of the cylindrical barrel (3a) between the anti-vibration basic member (2) and the first diaphragm (4) through a seal rubber layer (1a) formed integral with the anti-vibration basic member (1).

The interior chamber between the vibration preventive member (1) and the first diaphragm (4) is filled with a non-compressive liquid of water, ethylene glycol or the like. By a partitioning structure of the interior chamber with the partitioning part (10), a main liquid chamber (7) is formed between the anti-vibration basic member (1) and the partitioning part (10) while a first sub liquid chamber (8) is formed between the first diaphragm (4) and the partitioning part (10).

Furthermore, in the partitioning part (10) at a side of the main liquid chamber (7), provided are a second sub liquid chamber (9) and a switch chamber (12) partitioned from the second sub liquid chamber (9) by a second diaphragm (11) to enable switching the admission of between an atmospheric pressure and a negative pressure. First and second orifices (13), (14), different in liquid passage resistance, are provided to communicate respectively between the main liquid chamber (7) and the first and second sub liquid chambers (8), (9). In the figure, the first sub liquid chamber (8) is continuous with the first orifice (13) greater in liquid passing resistance (smaller in sectional area) while the second sub liquid chamber (9) is with the second orifice (14) smaller in liquid passing resistance (greater in sectional area).

The partitioning part (10) is made up, as shown in FIGS. 1 to 7, by a partition main member (15), a partition plate member (16), a partition retaining plate (17) and so on, thus providing the following structure.

Figure 3:
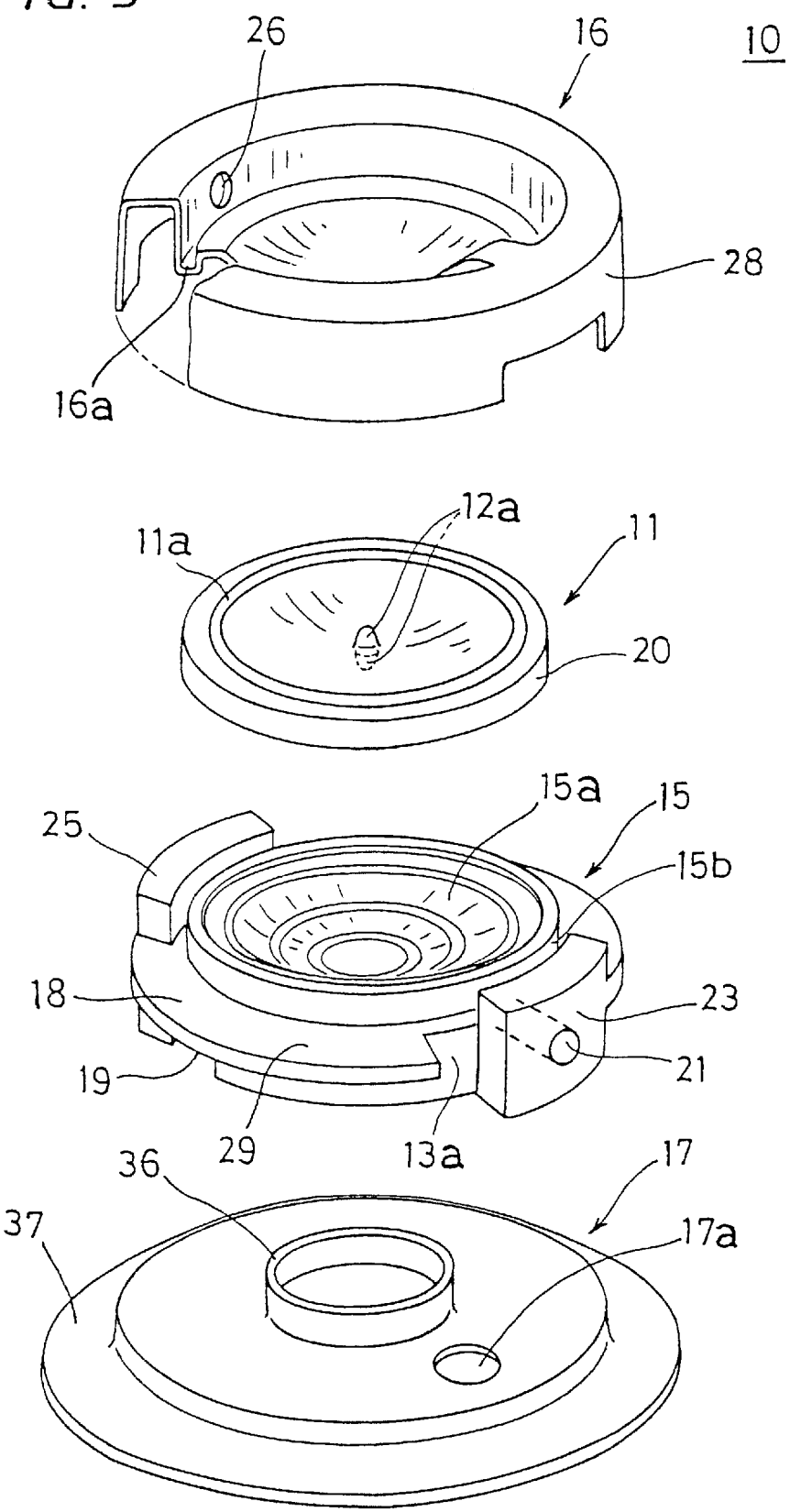
FIG. 3 is a perspective view having separated structural parts of a partition of the same.
Figure 4:
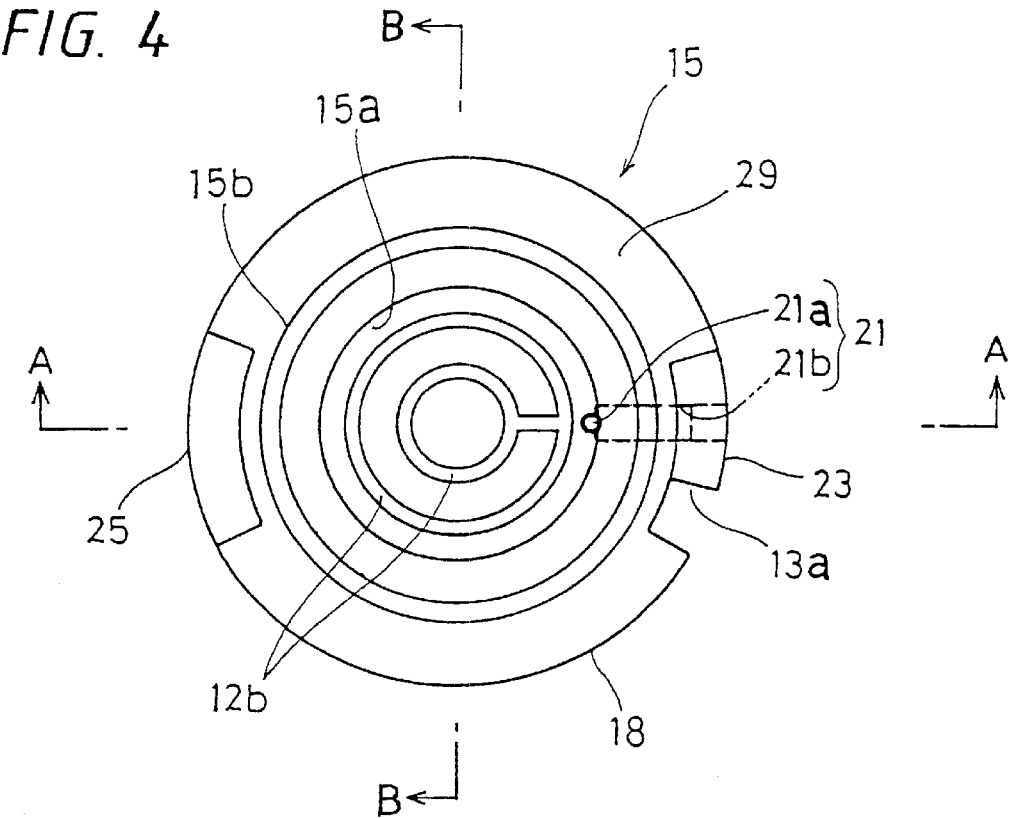
FIG. 4 is a plan view of a partition main member of the same.
Figure 5:
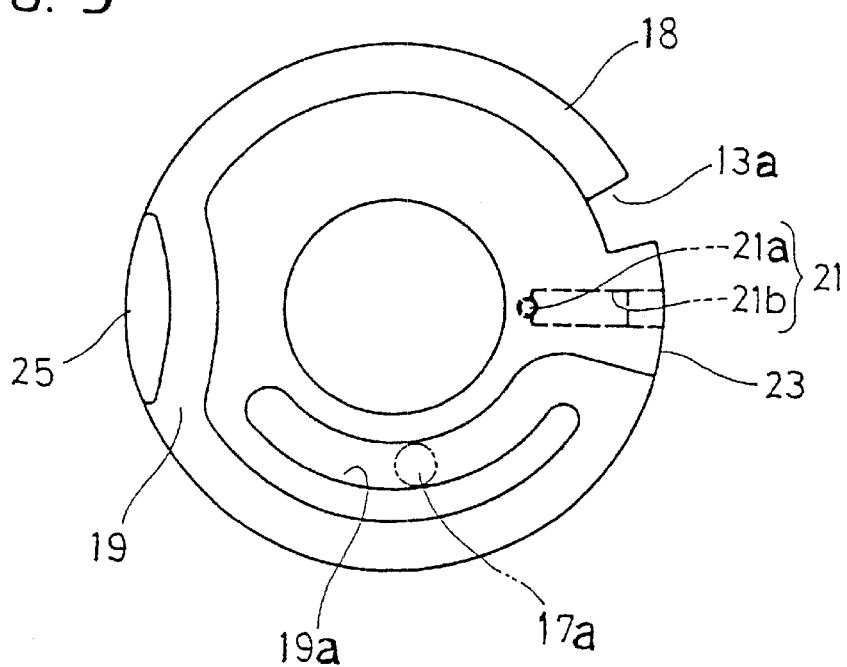
FIG. 5 is a bottom view of the partition main member of the same.
Figure 6:
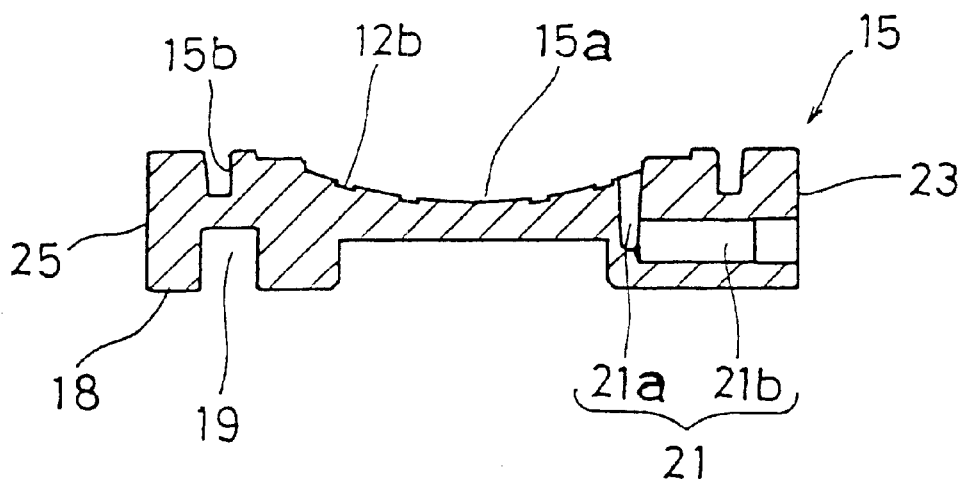
FIG. 6 is a sectional view on line A—A in FIG. 4.
Figure 7:
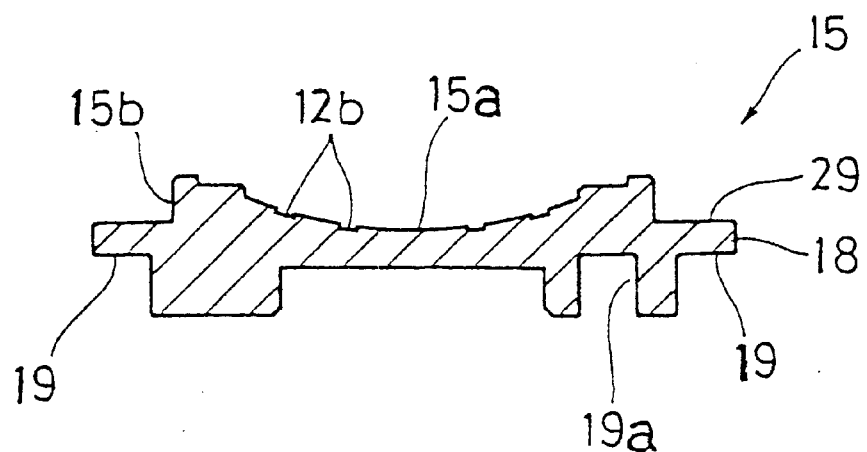
FIG. 7 is a sectional view on line B—B in FIG. 4.

The partition main member (15) is integrally formed of a metal material, such as aluminum, or a rigid material, such as a synthetic resin material. As shown in FIG. 3, a recess (19) for orifice is formed on a side of the first sub liquid chamber (8) in a manner of leaving a circular periphery (18) in a flange form. The recess (19) is defined by the partition retaining plate (17) and the inner peripheral surface of the cylindrical barrel (3a), thereby forming a first orifice (13) to communicate between the main liquid chamber (7) and the first sub liquid chamber (8). A communicating portion (13a) is cut out in part of the outer periphery (18) to communicate between the first orifice (13) and the main liquid chamber (7).

Also, in an inward of the upper surface on a side of the main liquid chamber of the partition main member (15), a second diaphragm (11), having an annular collar metal fitting (20) fixed in an outer periphery through vulcanizing adhesive means, is attached in an arrangement coaxial to a center axis due to press-fitting the collar metal fitting (20). Between the diaphragm (11) and the partition main member (15), a switch chamber (12) is formed having a predetermined clearance. (12a) is a projection for keeping a clearance of a constant amount or the greater while (12b) is a slight recess groove to prevent the diaphragm (11) from being closely contacted with the partition main member (15).

In the figure, the partition main member (15) has a recess provided in a curved form in an upper-surface center corresponding to the switch chamber (12) and a press-fit surface (15b) formed by a vertical surface due to a step-down, groove or the like in a peripheral portion of the recess (15a). The diaphragm (11) is attached in a manner covering the recess (15a) by press-fitting the collar metal fitting (20) to the press-fit surface (15b).

The partition main member (15) is provided with a passage (21) communicating the interior of the switch chamber (12) to the outer periphery through a passage side surface. The passage (21), while covered over by the cylindrical barrel (3a), is inserted with a admission pipe (22) for switching between an atmospheric pressure and a negative pressure. The switch chamber (12) is connected to switch means (not shown) such as a switching valve, to be switchably connected to any of a negative-pressure source and an atmospheric pressure source through the passage (21) and admission pipe (22). Any of an atmospheric pressure and a negative pressure is to be admitted by operating the switch means on the signals from control means.

This enables switch-control the second diaphragm (11) over between a movable state and a immovable state. When functioning the first orifice (13) greater in liquid passage resistance, the second diaphragm (11) is stopped in movement to function the second orifice (14) greater in sectional area. Thus, a sufficient damping effect can be structurally exhibited on the vibrations in different frequency zones by the respective orifices (13), (14).

The switching admission pipe (22) is radially press-fitted in the passage (21) through an opening (35) of the cylindrical barrel 3a after the partition (10) is press-fitted and assembled in the cylindrical barrel (3a). Due to this press-fitting, the passage (21) is formed with a bore portion (21a) vertically extending downward from one point of the switching chamber (12) and a bore portion (21b) radially extending from the bore (21a) and opened in an outer peripheral surface.

Furthermore, the partition main member (15) has a seal surface (23) formed broader than the other portion contacted with a seal rubber layer (31) on an inner periphery of the cylindrical barrel (3a), in a position around the opening end of the passage (21) in the outer peripheral surface in a manner surrounding the same. Furthermore, on a side opposite to the seal surface (23) with respect to a device axis, a pressure-receiving surface (25) broader than the other portion of the outer peripheral surface. Thus, an external force caused upon press-fitting the admission pipe (12) can be structurally dispersed.

Particularly, in the figure, the recess (19) for orifice provided at the side of the first sub liquid chamber (8) of the outer periphery of the partition main member (15) is formed avoiding the seal surface (23) and pressure-receiving surface (25), whereby the seal surface (23) and pressure-receiving surface (25) is formed having a broader surface than the other portion. Furthermore, in the figure, the recess (19) is formed bent back toward the inward in a required point to extend in an arcuate form about the device axis, to have a length of approximately 1.0 to 1.5 times a peripheral length, preferably nearly 1.5 times the peripheral length. (19a) shows a recess in the arcuate form extending by bending back.

Meanwhile, the partition plate member (16) is a pressed part mainly from a steel plate or the like having an annular projection (16a) formed in a lower surface thereof. This is press-fitted over the partition main member (15) at a side of the main liquid chamber (7) in the cylindrical barrel (3a) at an inner periphery, and held sandwiched between the partition main member (15) and a peripheral edge of the anti-vibration basic member (1) in the main liquid chamber (7) such that the second diaphragm (11) at the peripheral edge (11a) is held and sealed by the projection (16a). Due to this, the space between the inward of the projection (16a) and the diaphragm (11) is formed as a second sub liquid chamber (9). Furthermore, in the outward of that, the space defined by the partition main member (15) and the partition plate member (16) is formed as a second orifice (14) comparatively great in sectional area to communicate between the main liquid chamber (7) and the second sub liquid chamber (9) by a continuous hole portions (26) and (27). The first orifice (13) is in communication with the main liquid chamber (7) through the continuous hole portion (26) of this second orifice (14). That is, the first orifice (13) and the second orifice (14) has a common outlet/inlet port from/to the main liquid chamber (7).

Furthermore, in the shown embodiment, the corresponding area in the outer-peripheral upper surface of the partition main member (15) to the second orifice (14) is formed by cutout in a step-down form in an area except for that of the seal surface (23) and pressure-receiving surface (25). Due to this, while a broad area is secured in the portion of the seal surface (23) and pressure-receiving surface (25), the outer periphery (18) at the other portion is reduced in thickness. Correspondingly, the cylindrical outer periphery (28) of the partition plate member (16) at a point corresponding to the cutout (29) is formed extending downward.

Also, the partition retaining plate (17), as a pressed part from a steel plate or the like similarly to the foregoing, comprises a doughnut-formed disc having an opening in a center and a diameter somewhat greater than the partition main member (15). On a side of the first sub liquid chamber (8) of the partition main member (15), an opening edge (36) in the center is press-fitted in the recess provided in a central lower surface of the partition main member (15) whereby an outer peripheral edge (37) is fixed in contact with the partition main member (15) in a state extending outward.

In the partition retaining plate (17), an opening (17a) is provided matched to an arbitrary lengthwise position of the bent-back arcuate recess portion (19a) of the recess (19) so that the first orifice (13) is in communication with the first sub liquid chamber (8). The partition retaining plate (17) at an outer peripheral edge (37) is fixed by crimping, together with the reinforcing member (41) of the first diaphragm (4) and the opening edge (31a) in the bottom member (3b) of the second metal fitting (3), in a lower end (31a) of the cylindrical barrel (3a).

In the illustrated embodiment, the anti-vibration basic member (1) has an extended portion (1c) reinforced by a part of the cylindrical barrel (3a), in a part of an circumference on a larger diameter side thereof. Furthermore, a part of a stabilizer (38) fixed on the first metal fitting (2) by nut co-tightening means or the like is arranged adjacent to the upper and lower part of the extended portion (1c). This is provided to play a role of stop action to regulate a vertical excessive displacement upon large displacement.

To assemble a liquid-filled vibration isolator of the above structure, first in air a collar metal fitting (20) is press-fitted to a press-fit surface (15b) in an upper-surface recess (15a) of a partition main member (15), thereby attaching a second diaphragm (11) in a manner of forming a switch chamber (12) in a space with the partition main member (15). Also, a partition retaining plate (17) is attached in a center on a side of a first sub liquid chamber (8) (on a side of the lower surface) of the partition main member (15) by the press-fit means so that the opening (17a) provided in the partition retaining plate (17) is matched to a position of a bent-back-extended recess (19a) of an orifice recess (19) provided in a lower surface of the partition main member (15). On this occasion, the opening (17a) is adjusted in position within a length range of the recess (19a), thereby making possible to facilitate the adjustment of the length of a first orifice (13).

Next, in a liquid tank a partition plate member (16) is first press-fitted into a cylindrical barrel (3a) of a second metal fitting (3) integrally vulcanized on the anti-vibration basic member (1) to a position of abutting against a anti-vibration basic member (1), from a lower side in an open state prior to crimp-tightening the lower end (31a). Subsequently, the partition main member (15) is press-fitted to a position of abutting against the partition plate member (16) so that they are fitted liquid-tight through a seal rubber layer (1a). Simultaneously, the partition retaining plate (17) at an outer peripheral edge (17a) is placed in contact with an inner step in the lower end (31a) of the cylindrical barrel (3a). Also, on this occasion, positioning is made between an opening end of a passage (21) of the partition main member (15) and an opening (35) of the cylindrical barrel (3a). Furthermore, positioning is made between the orifice opening of the partition plate member (16) and a continuous hole. In this manner, the second diaphragm (11) at a peripheral edge is held by a projection (16a) of the partition plate member (16), together with the formation of a second sub liquid chamber (9) and second orifice (14).

After air removal, the partition retaining plate (17) at the outer peripheral edge (37), together with a reinforcing member (41) of the first diaphragm (4) and an opening edge (31a) in a bottom member (3b) of the second metal fitting (3), may be fixed by crimping in the lower end (31a) of the cylindrical barrel (3a). Incidentally, the liquid intruded in a switch chamber (12) can be drained by taking the out of the liquid tank after the assembling. Also, a rubber plug may be inserted in the passage (21) before the assembling to prevent against liquid intrusion so that the rubber plug is removed after taking out of the liquid tank.

After assembling and taking out of the liquid tank as in the foregoing, a switching admission pipe (22) for admitting an atmospheric pressure or negative pressure to the switch chamber (12) is press-fitted and assembled in a diametrical bore (216) of a passage (21) provided in the interior partition main member (15) through an opening (35) provided in the cylindrical barrel (3a).

On this occasion, because a broader pressure-receiving surface (25) than the other portion is provided to the opposite side to the opening end of the passage (21) that suffers the greatest force during press-fitting the admission pipe (22), the external force of upon press-fitting the admission pipe can be dispersed by reception on the pressure-receiving surface (25), thereby making possible to prevent the partition main member (15) from relatively displacing due to compression or the like of the seal rubber layer (1a) in an inner periphery of the cylindrical barrel (3a). Also, because the seal surface (23) is formed at around the opening of the passage (21) ready to be loosen upon press-fitting the admission pipe (22) in a manner surrounding same, there is no possibility of loosening in the seal state. Consequently, it is possible to keep favorable sealability between the partition main member (15) and the seal rubber layer (1a) in an inner periphery of the cylindrical barrel (3a).

By the assembling as the above, it is possible to easily assemble a liquid-filled vibration isolator of a controlled type of FIG. 1 which has a main liquid chamber (7), first and second two sub liquid chambers (8), (9), first and second two orifices (13), (14) and first and second two diaphragms (4), (11) whereby the movement of the second diaphragm (11) can be switch-controlled between a movable state and an immovable state by switch-adjust the admission of a negative pressure and an atmospheric pressure of a switch chamber (12) adjacent the second sub liquid chamber (9) communicating with the second orifice (11) lower in liquid passage resistance. Moreover, stable liquid sealing and assembling can be secured.

INDUSTRIAL APPLICABILITY

As described in the above, according to the controlled-type liquid-filled vibration isolator of the present invention, in the controlled-type liquid-filled vibration isolator it is possible to prevent the internal partition from relatively displacing, obtain stable liquid filling and assembly, keep the anti-vibration characteristic favorable and improve durability while reducing the affection due to press-fitting an admission pipe for admitting, by switching, atmospheric pressure and negative pressure to the switch chamber. Also, even where the partition main member id formed by an integrally formed part of a metal material, such as aluminum, or a synthetic resin, the outer peripheral thickness of the main member can be decreased thus contributing to material saving and weight reduction.

What is claimed is:

1. A controlled-type liquid-filled vibration isolator comprising:

an anti-vibration basic member formed by a rubber elastic member;

a first metal fitting coupled to one of an upper side and a lower side of said anti-vibration basic member;

a second metal fitting having a cylindrical barrel coupled to the other side of said anti-vibration basic member;

a first diaphragm attached in said cylindrical barrel oppositely to said anti-vibration basic member;

a partition arranged between said anti-vibration basic member and said first diaphragm;

a main liquid chamber formed between said partition and said anti-vibration basic member;

a first sub liquid chamber formed between said partition and said first diaphragm;

a switch chamber capable of admitting, by switching, atmospheric pressure and negative pressure formed inward at a main liquid chamber side of said partition by a second diaphragm;

a second sub liquid chamber isolated from said switch chamber by said second diaphragm;

first and second orifices respectively communicating said main liquid chamber with said first and second sub liquid chambers;

said partition having a partition main member having a recess forming a first orifice at a side of said first sub liquid chamber in an outer periphery and a partition plate member arranged at a side of said main liquid chamber of said partition main member forming said second sub chamber and second orifice, these being fitted on said cylindrical barrel through a seal rubber layer, and further a passage communicating from said switch chamber to the outer periphery being provided in said partition main member and said passage being fitted with an admission pipe for switching between atmospheric pressure and negative pressure penetrating said cylindrical barrel; and said partition main member having a seal surface in contact with said seal rubber layer in an inner periphery of said cylindrical barrel, being located at an outer periphery of said partition main member at around an opening end of said passage in a manner surrounding said passage, and sealing said passage, and a pressure-receiving surface broader than the other portion of the outer periphery of said partition main member, being provided on an opposite side to said seal surface sandwiching a device axis to enable dispersion of an external force upon press-fitting said admission pipe, and said pressure receiving surface extending from top to bottom of the partition main member and being absent an orifice.

2. A controlled-type liquid-filled vibration isolator according to claim 1, wherein said recess for said first orifice provided at a side of said first sub liquid chamber in an outer periphery of said partition main member is formed avoiding said seal surface and pressure-receiving surface thereby forming said seal surface and pressure-receiving surface to possess a surface broader than the other portion.

3. A controlled-type liquid-filled vibration isolator according to claim 1 or 2, wherein said second sub liquid chamber and said second orifice are respectively formed at an inward and an outer periphery by said partition plate member arranged on a main liquid chamber side of said partition main member, said partition main member having a portion on an outer periphery upper surface of said partition main member corresponding to said second orifice being cutout in an area except for a portion of said seal surface and pressure-receiving surface.

4. A controlled-type liquid-filled vibration isolator according to claim 1 or 2, wherein said recess for said first orifice provided at a side of said first sub liquid chamber in the outer periphery of said partition main member is bent back inward at a required point to extend in an arcuate form about a device center, to have a length of approximately 1.0 to 1.5 times a circumference of said first orifice.

5. A controlled-type liquid-filled vibration isolator according to claim 4, wherein a partition retaining plate is fixed by press-fit means at a side of said first sub liquid chamber of said partition main member, an opening of said recess for said first orifice on a side of said first sub liquid chamber being covered by said partition retaining plate thereby forming the first orifice, and said opening being provided in a position matched to said recess bent back of said partition retaining plate.

* * * * *